Patented July 22, 1924.

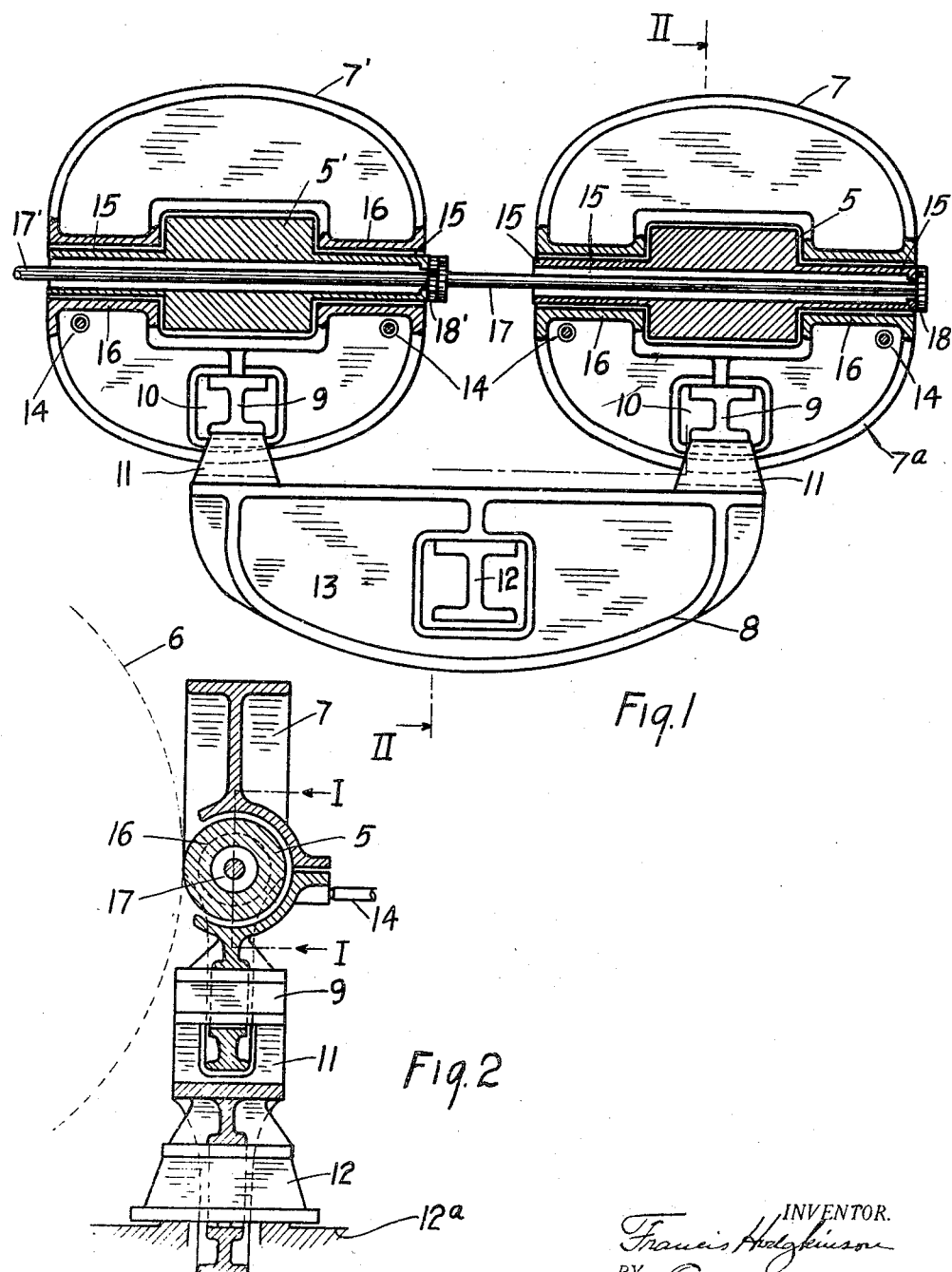

1,502,199

UNITED STATES PATENT OFFICE.

FRANCIS HODGKINSON, OF EDGEWOOD, PENNSYLVANIA, ASSIGNOR TO WESTINGHOUSE GEAR & DYNAMOMETER COMPANY, A CORPORATION OF PENNSYLVANIA.

FLOATING FRAME.

Application filed July 19, 1919. Serial No. 311,971.

*To all whom it may concern:*

Be it known that I, FRANCIS HODGKINSON, a subject of the King of Great Britain and Ireland, and a resident of Edgewood, in the county of Allegheny and State of Pennsylvania, have made a new and useful invention in Floating Frames, of which the following is a specification.

This invention relates to gearing of the floating frame type.

The floating frame gear is well known. It fundamentally consists of two intermeshing gears, one of which is journaled in rigid bearings, and the other of which is journaled in a floating frame. The purpose of the floating frame is to allow one of the gears, for example, a pinion, to have a slight angular motion sufficient to compensate for distortion (due, for example, to torsional deflection of the pinion), and to thereby maintain an even distribution of pressure throughout the length of the intermeshing teeth.

Gearing for transmitting large power is usually of the double helical type, that is, the teeth are in the form of helices and are divided into two oppositely inclined sets so that the end thrust occasioned by one set is counterbalanced by the thrust occasioned by the other set. In the floating frame type of gearing the angular movement of the floating gear of course varies the position of the axis of both sets of teeth forming a part of that gear. While such a construction is satisfactory for the powers now encountered, the ever increasing size and power of turbines and other power developing apparatus necessitates further improvement of the gearing in order that a more effective compensation for distortion or deflection may be obtained.

An object of my invention is to produce a gearing in which a more uniform distribution of the load throughout the length of the gear teeth is obtained than is possible with known forms of gearing.

A further object is to produce a new and improved arrangement of floating frames which permits each set of teeth of a gear or pinion to have an independent compensating or self-adjusting movement.

A further object is to produce a new and improved arrangement of gearing whereby the two halves of a divided gear or pinion may move as a whole or may move independently of each other, in distributing the load uniformly along the length of the teeth.

These and other objects which will be made apparent throughout the further description of my invention, are attained by means of apparatus embodying the feaures herein described and illustrated in the drawings accompanying and forming a part hereof.

In the drawings: Fig. 1 is a diagrammatic sectional view, along the line I—I of Fig. 2, and illustrates an arrangement of apparatus embodying my invention.

Fig. 2 is a sectional view along the broken line II—II of Fig. 1.

Referring to Figure 1, a two part pinion 5, 5' is mounted in such a manner that the two parts may move as a whole or independently of each other in order to compensate for torsional distortion, deflection, slight misalignment or other cause which detrimentally affects the operation of gears employed in transmitting large power. As diagrammatically shown in Fig. 2, the pinion 5, 5' is adapted to transmit power to a large gear 6 with which the pinion meshes. It will, of course, be understood that in the apparatus illustrated the teeth of the gear 6 are also divided into two sets, each of which meshes with one of the sets of teeth formed on the two part pinion, but that the two sets of teeth of the gear are rigidly secured together.

As illustrated the two parts 5, 5' of the pinion are mounted in separate but axially aligned frames 7, 7' which, in turn, are mounted on opposite ends of a third and larger frame 8. As illustrated each frame is mounted on a flexible support such as an I-beam. As shown, each of the floating frames 7—7' is separately mounted on a short section of an I-beam 9, which extends through suitable openings 10, formed in a web portion of the frame. In the apparatus illustrated, each I-beam 9 is mounted on a pedestal 11, which, as shown, supports the ends of the beam and subtends a flange 7ª, forming a part of the frame. The pedestals 11 are mounted on opposite ends of the floating frame 8. As illustrated, the floating frame 8 is mounted on a centrally located I-beam 12 which extends through an opening formed in a web 13 of the frame 8 and which may be mounted on the bed plate 12ª of the gearing.

I have shown struts 14 which are adapted to bear against the floating frames 7 and 7' and to restrict their movement to a plane substantially at right angles to the plane and the axes of the gear set. The outer ends of the struts 14 may rest in suitable sockets in the gear casing, not shown, and means may be employed for adjusting the position of the struts.

As illustrated, each pinion half, 5—5' is provided with integrally formed journals 15, located on each side of the pinion half, and mounted in bearings 16. These bearings are mounted in the floating frame 7—7'. Each pinion half and its journal is hollow, not only for the purpose of reducing the weight, but also for the purpose of permitting the use of long flexible drive shafts without detracting from the compactness of the installation. The power to be transmitted is delivered to a shaft 17' which, as illustrated, extends through the hollow journals 15 and the hollow pinion half 5' to the inner end of the inner journal of the half 5'. The shaft 17 is rigidly secured to this journal by means of a suitable flange 18'. As shown, the pinion half 5 is driven by means of a shaft 17 which is secured to the flange 18' and which extends through its hollow interior to the outer end of the outer journal 15, to which it is secured by means of a flange 18. The flexible drive permits the floating frames 7—7' to pivot about their respective I-beams 9 so that each gear half may move independently to different angular positions. In addition to this, both gear halves may move together to different angular positions because the frame 8 is mounted on a flexible support or is capable of floating. As a result this construction gives a maximum compensation for distortion and deflection.

While I have illustrated and described but one embodiment of my invention, it will be apparent that various changes and modifications may be made in the apparatus herein illustrated and that the invention may be employed in connection with the intermediate pinion of a double reduction gearing or with the driven gear of a single or double reduction gearing without departing from the spirit and scope of the invention as set forth by the appended claims.

What I claim is:

1. In a reduction gearing, a gear having two sets of oppositely inclined gear teeth formed thereon, a second gear meshing therewith and formed in two parts, each part having a set of gear teeth formed thereon and meshing with one of the sets of gear teeth formed on the first mentioned gear, a flexible driving connection between the two parts of the second gear, a separate floating frame in which each part of the second gear is journaled, and a floating member on which said floating frames are mounted.

2. A floating frame arrangement for gearing, including gear members, flexibly mounted supporting means for the gear members, and flexibly mounted means on which said supporting means are mounted.

3. In combination in gearing of the floating frame type, gear members, floating frames in which the gear members are mounted, and a floating frame on which said first mentioned floating frames are mounted.

4. In a reduction gear, the combination of axially-alined driving gear members, a single supporting frame for each of the driving gear members, and independent flexible supporting means for the frames.

5. Gearing having a gear member divided into parts, and mounting means for said parts for permitting independent movements of each part, and of the member as a whole, to compensate for deflections.

6. In a gear set, a pinion divided into a plurality of parts, flexible driving means for said parts, a separate floating frame for each of said parts, and a floating frame on which said first mentioned floating frames are mounted.

7. In a reduction gear, the combination of a two-part pinion, a mounting therefor comprising a floating frame for each part, and a third floating frame on which the first mentioned floating frames are mounted, the arrangement being such that the pinion may move as a whole or the parts may move independently of one another in compensating for deflections.

8. In a reduction gear, the combination of a plurality of axially alined pinion frames, a main frame below the pinion frames, and flexible supporting means for the main frame and between the pinion and main frames for the pinion frames.

9. In a reduction gear, the combination of a plurality of axially alined pinion frames, a main frame, and I-beam supports for the main frame and between the pinion and main frames for the pinion frames.

10. In a reduction gear, the combination of a plurality of pinion frames having axially alined bearings, pinions having journal portions fitting in the bearings, flexible driving means connected to one of the journal portions of each of the pinions, and flexible supporting means for the pinion frames.

11. In gearing of the character described, coacting gears, each of said gears including a pair of sections having gear teeth, the gear teeth of the sections of one of said gears meshing with the gear teeth of the other of said gears, the separate sections of one of said gears being hollow and flexibly connected, a separate bearing for each of said hollow sections, a rocking frame carrying each of said bearings, and separate means for resiliently resisting rocking movement of each of said frames.

12. In gearing of the character described, a flexible drive shaft, a hollow sleeve pinion including separate sections, a coupling flange connecting each of said sections with said flexible drive shaft, a gear including sections operatively engaged with said pinion sections, and a rocking frame carrying each of said pinion sections, and means for resiliently resisting rocking movement of each of said frames.

13. In gearing of the character described, a gear including sections having gear teeth, a hollow sleeve pinion including separate flexibly connected sections, the sections of the pinion having gear teeth meshing with the gear teeth of the sections of the gear, a bearing for each of the sections of the hollow sleeve pinion, a movable frame for each of said bearings, and separate means for resiliently resisting movement of each of said frames.

In testimony whereof, I have hereunto subscribed my name this 17th day of July, 1919.

FRANCIS HODGKINSON.